United States Patent [19]

Lawrence

[11] Patent Number: 5,735,529
[45] Date of Patent: Apr. 7, 1998

[54] BEADS FOR GASKETS

[75] Inventor: Toby James Patrick Lawrence, Biggleswade, England

[73] Assignee: T&N Technology Limited, Rugby, England

[21] Appl. No.: 750,202

[22] PCT Filed: Jun. 1, 1995

[86] PCT No.: PCT/GB95/01262

§ 371 Date: Nov. 21, 1996

§ 102(e) Date: Nov. 21, 1996

[87] PCT Pub. No.: WO95/34775

PCT Pub. Date: Dec. 21, 1995

[30] Foreign Application Priority Data

Jun. 15, 1994 [GB] United Kingdom .............. 9411966

[51] Int. Cl.⁶ .................................................. F16J 15/12
[52] U.S. Cl. .................. 277/180; 277/207 R; 277/235 B
[58] Field of Search ............................. 277/180, 207 R, 277/235 B

[56] References Cited

U.S. PATENT DOCUMENTS

| | | | |
|---|---|---|---|
| 2,513,178 | 6/1950 | Jackson | 277/180 |
| 3,178,778 | 4/1965 | Reahard | 277/207 R |
| 3,355,181 | 11/1967 | Olson | 277/180 |
| 3,575,431 | 4/1971 | Bryant | 277/207 R |
| 3,737,169 | 6/1973 | Glynn | 277/235 B |
| 3,909,017 | 9/1975 | Engstrom | 277/207 R |
| 4,254,960 | 3/1981 | Jelinek | 277/207 R |
| 4,305,595 | 12/1981 | Miyagishima et al. | 277/207 R |
| 4,312,512 | 1/1982 | Conte et al. | 277/235 B |
| 4,597,583 | 7/1986 | Inciong et al. | 277/235 B |
| 4,768,684 | 9/1988 | Dugge | 277/207 R |
| 4,828,275 | 5/1989 | Udagawa | 277/235 B |
| 4,856,796 | 8/1989 | Genin | 277/235 B |
| 5,145,190 | 9/1992 | Boardman | 277/235 B |
| 5,236,205 | 8/1993 | Chen et al. | 277/235 B |
| 5,267,740 | 12/1993 | Stritzke | 277/207 R |
| 5,322,299 | 6/1994 | Terai | 277/235 B |
| 5,540,452 | 7/1996 | Belter | 277/235 B |
| 5,615,898 | 4/1997 | Clark et al. | 277/235 B |

FOREIGN PATENT DOCUMENTS

| | | | |
|---|---|---|---|
| 0069569 | 11/1958 | France | 277/207 R |
| 2016629 | 9/1979 | United Kingdom | F16L 21/02 |

*Primary Examiner*—William A. Cuchlinski, Jr.
*Assistant Examiner*—John L. Beres
*Attorney, Agent, or Firm*—Synnestvedt & Lechner

[57] ABSTRACT

An elongated bead made of resilient material is used to make a seal in a gasket. In an uncompressed state, the bead has a cross-sectional shape which is defined by a substantially planar bottom surface, two inwardly-inclined side surfaces, and a convexly-curved top surface which is joined to the side surfaces by transitional curved joining surfaces.

6 Claims, 1 Drawing Sheet

BEADS FOR GASKETS

FIELD OF THE INVENTION

This invention is concerned with beads for use in gaskets to create seals.

BACKGROUND OF THE INVENTION

Gaskets for use in, for example, automotive applications often comprise a supporting sheet, eg of steel, on one or both surfaces of which elongated beads are adhered. Such beads are made, eg by extrusion, from resilient material, eg elastomeric material, and are arranged to be compressed to create a seal between the supporting sheet and a surface of an adjacent member. One possible application for such gaskets is between the head and the cylinder block of an internal combustion engine, where beads may extend around the periphery of the gasket or around the engine cylinders.

The elongated resilient beads used in gaskets have a constant cross-sectional shape along the bead, when the bead is in an uncompressed state. This cross-sectional shape is designed to ensure a good seal. For example, one known bead has its cross-sectional shape defined by a substantially planar bottom surface which is adhered to the supporting sheet, two inclined side surfaces which meet the bottom surface at 45° and extend upwardly and inwardly, and a substantially planar top surface which extends between the side surfaces parallel to the bottom surface. This prior art bead is illustrated in an uncompressed state in FIG. 1 and in a compressed state in FIG. 2. It can be seen from a comparison of FIGS. 1 and 2 that the bead is greatly deformed during compression. This great deformation can cause the bottom surface to be torn off the supporting sheet with the result that the bead may be moved from its intended position.

SUMMARY AND OBJECTS OF THE INVENTION

It is an object of the present invention to provide a bead which when compressed has a reduced tendency to be torn off its supporting sheet.

The invention provides an elongated bead made of resilient material and suitable to be compressed between two members to create a seal, the bead having a cross-sectional shape which, in an uncompressed state of the bead, is substantially constant along the length of the bead, characterised in that said cross-sectional shape is defined by a substantially planar bottom surface, two inclined side surfaces which extend upwardly at inwards inclinations from junctions with the bottom surface, and a convexly-curved top surface which is joined to the side surfaces by transitional curved joining surfaces.

In a bead in accordance with the invention, the inwards inclination of the side surfaces, which are preferably substantially planar, can be decreased without reducing the effectiveness of the bead as a seal. A decrease in the inclination, ie a decrease in the angles between the side surfaces and the bottom surface, is found to be beneficial from the point of view of preventing the bottom surface from being torn off the supporting sheet, although the inclination cannot be decreased beyond a certain point without causing the material of the bead to buckle under compression with the likelihood of the material cracking. The provision of the convexly-curved top surface enables the bead to make a good seal even when the inclination is decreased since the additional material required to make the convex curve compensates for the decrease in the height of the upper edges of the side surfaces above the bottom surface.

For some conditions, it is preferred that the side surfaces are inclined at between 35° and 25° to the bottom surface. In one particular case, the optimum angle of inclination, ie the lowest tendency to be torn off without buckling, was found to be 29°.

The top surface may have the shape of a portion of a cylinder but other curved surfaces, such as paraboloid and ellipsoidal surfaces, may be possible.

The invention also provides a gasket comprising at least one supporting sheet and at least one length of bead according to the invention adhered to one surface of said supporting sheet.

There now follow detailed descriptions, to be read with reference to the accompanying drawings, of a prior art gasket incorporating a prior art bead and of an illustrative gasket in accordance with the invention incorporating an illustrative bead in accordance with the invention.

DETAILED DESCRIPTION OF THE PREFERRED EMBODIMENT OF THE INVENTION

Figure 1:
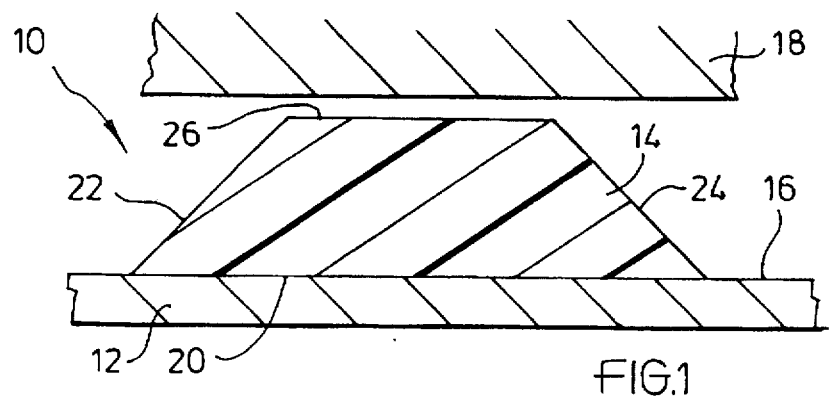
FIG. 1 is a cross-sectional view, on a greatly enlarged scale, taken through a portion of the prior art gasket, showing the prior art bead in an uncompressed state.
Figure 2:
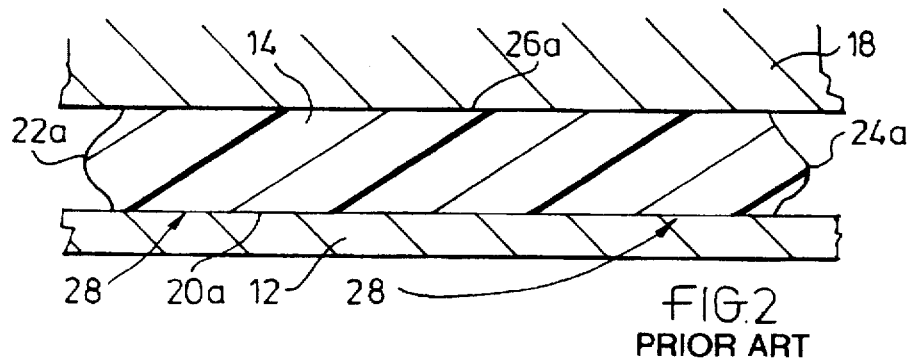
FIG. 2 is a view similar to FIG. 1 but showing the prior art bead in a compressed state.

The prior art gasket 10 shown in FIGS. 1 and 2 comprises a supporting sheet 12 made of steel and a bead 14 which is adhered to an upper surface 16 of the sheet 12.

The bead 14 is made of resilient material and is suitable to be compressed between two members, in this case the sheet 12 and a head 18, to create a seal. The bead 14 is an extrusion of elastomeric material and, when in the uncompressed state in which it is shown in FIG. 1, has a cross-sectional shape which is substantially constant along the length of the bead. This cross-sectional shape is defined by a substantially planar bottom surface 20 which is adhered to the surface 16, a left inclined side surface 22, a right inclined side surface 24, and a top surface 26. The top surface 26 is substantially planar and is parallel to the bottom surface 20. The side surfaces 22 and 24 meet both the bottom surface 20 and the top surface 26 at 45° and incline inwardly so that the top surface 26 is narrower than the bottom surface 20.

A comparison of FIG. 2 with FIG. 1 reveals that, in moving from its uncompressed state to its compressed state, the material of the bead 14 is deformed very considerably. In its compressed state, the bead 14 has a planar bottom surface 20a which is wider than the surface 20, two side surfaces 22a and 24a which bulge outwardly in generally convex shapes, and a planar top surface 26a which is wider than the surface 26. The top surface 26a is also wider than the bottom surface 20, being approximately the same width as the bottom surface 20a.

In moving from its uncompressed state to its compressed state, it is found that the material of the bead 14 tends to be torn off the surface 16 in the regions indicated by 28 in FIG. 2.

Figure 3:
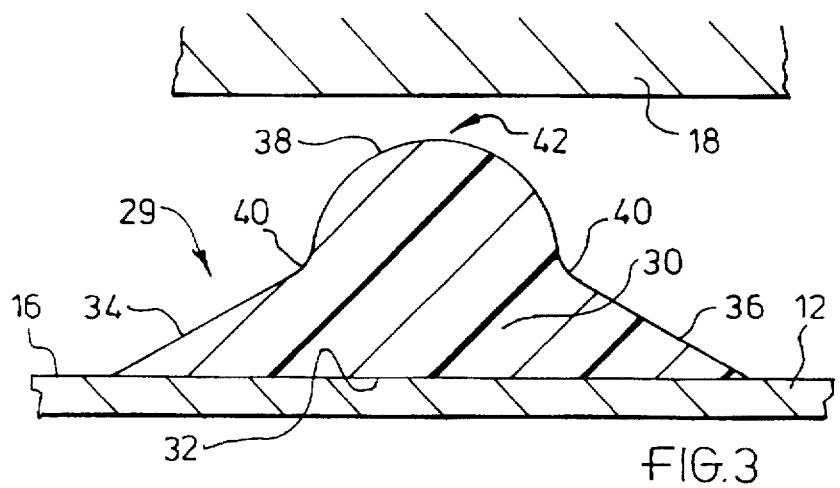
FIGS. 3 and 4 are views similar to FIGS. 1 and 2, respectively, but taken through the illustrative gasket and showing the illustrative bead.
Figure 4:
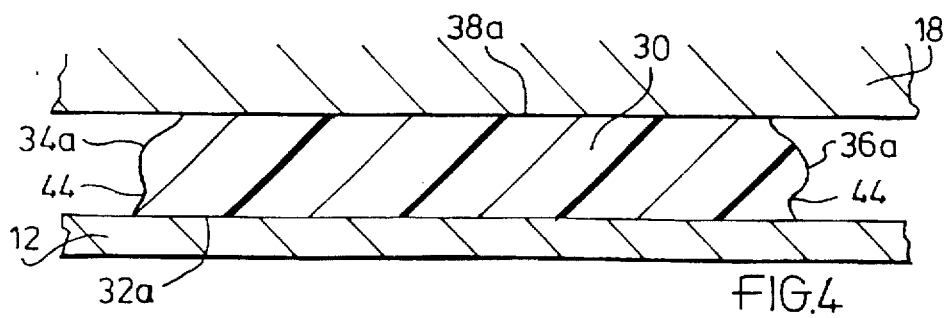

The illustrative gasket 29 which comprises the illustrative bead 30 is shown in FIGS. 3 and 4. The gasket 29 comprises sheet 12 to the upper surface 16 of which the bead 30 is adhered. The bead 30 is elongated and of substantially constant cross-section, when in its uncompressed state. The bead 30 is made of the same material as the bead 14 and is used for the same purpose. The bead 30, however, differs in its cross-sectional shape from the bead 14.

In the uncompressed state shown in FIG. 3, the bead 30 has a cross-sectional shape defined by a substantially planar bottom surface 32, two inclined side surfaces 34 and 36, and a convexly-curved top surface 38. The bottom surface 32 has the same width as the surface 20 of the bead 14 and is adhered to the surface 16 of the sheet 12. The side surfaces 34 and 36 are similar to the surfaces 22 and 24 of the of the bead 14 except that they are inclined at 29° to the bottom surface 32 rather than at 45° and, as the angle of inclination is less, the side surfaces 34 and 36 do not extend upwardly away from the bottom surface 32 as far as the side surfaces 22 and 24 extend from the bottom surface 20 of the bead 14. The upper edges of the side surfaces 34 and 36 are joined to the top surface 38 by short transitional concave surfaces 40. The top surface 38 is in the form of a half of a cylinder, ie except for the transitional surfaces 40, the upper portion of the bead 30 has the form of half of a cylinder. The crest 42 of the top surface 38 is further above the bottom surface 32 than the top surface 26 is above the bottom surface 20 of the bead 14.

A comparison of FIG. 3 with FIG. 4 shows that, in its compressed state, the bead 30 has a substantially planar bottom surface 32a which is of substantially the same width as the surface 32, two side surfaces 34a and 36a which are generally convex but have a fold 44 therein, and a planar top surface 38a which is slightly smaller in width than the surface 32a. Thus, in the bead 30, the top surface 38a does not extend beyond the bottom surface 32 which does not increase in width during compression. The folds 44 represent the beginning of buckling which is found to occur if the angle of inclination of the side surfaces 34 and 36 is significantly reduced.

It is found that the bead 30 has a significantly smaller likelihood of being torn off the surface 16 than the bead 14. Calculations show that the stress parallel to the surface 16 caused by compression of the bead has a maximum value of 2.5 MPa for the bead 30 as compared with 18.7 MPa for the bead 14. Also, calculations show that the contact stress between the bead 30 and the head 18, in the compressed state of the bead 30 is similar to the contact stress between the bead 14 and the head 18. The sealing function of the bead 30 is, thus, maintained.

I claim:

1. An elongated bead made of resilient material, the bead being adhered to a planar sheet of a gasket and extending around a closed path on the sheet so that the bead is arranged to create a seal between the sheet and a planar member when relative movement of approach occurs between the sheet and a member causing the bead to be compressed, the bead having a cross-sectional shape which, in an uncompressed state of the bead, is substantially constant along the length of the bead, wherein said cross-sectional shape is defined by a substantially planar bottom surface adhered to said sheet, two inclined side surfaces which extend upwardly at inwards inclinations from junctions with the bottom surface, and a convexly-curved top surface which is joined to the side surfaces by transitional curved joining surfaces.

2. A bead according to claim 1, wherein the side surfaces are substantially planar.

3. A bead according to claim 2, wherein the side surfaces are inclined at between 35° and 25° to the bottom surface.

4. A bead according to claim 1, wherein the top surface has the shape of half of a cylinder.

5. A bead according to claim 2, wherein the top surface has the shape of half of a cylinder.

6. A bead according to claim 3, wherein the top surface has the shape of half of a cylinder.

* * * * *